US011289095B2

(12) United States Patent
Zelenko

(10) Patent No.: US 11,289,095 B2
(45) Date of Patent: Mar. 29, 2022

(54) METHOD OF AND SYSTEM FOR TRANSLATING SPEECH TO TEXT

(71) Applicant: YANDEX EUROPE AG, Lucerne (CH)

(72) Inventor: Pavel Aleksandrovich Zelenko, Minsk (BY)

(73) Assignee: YANDEX EUROPE AG, Lucerne (CH)

( * ) Notice: Subject to any disclaimer, the term of this patent is extended or adjusted under 35 U.S.C. 154(b) by 78 days.

(21) Appl. No.: 17/035,207

(22) Filed: Sep. 28, 2020

(65) Prior Publication Data

US 2021/0201913 A1 Jul. 1, 2021

(30) Foreign Application Priority Data

Dec. 30, 2019 (RU) .......................... RU2019145083

(51) Int. Cl.
*G10L 15/26* (2006.01)
*G10L 15/197* (2013.01)
*G10L 15/08* (2006.01)

(52) U.S. Cl.
CPC ............ *G10L 15/26* (2013.01); *G10L 15/083* (2013.01); *G10L 15/197* (2013.01)

(58) Field of Classification Search
CPC ..... G10L 15/26; G10L 15/083; G10L 15/197; G10L 15/18
USPC .......................................................... 704/231
See application file for complete search history.

(56) References Cited

U.S. PATENT DOCUMENTS

| | | | |
|---|---|---|---|
| 6,937,986 B2 | 8/2005 | Denenberg et al. |
| 9,147,395 B2 | 9/2015 | Kim et al. |
| 9,484,025 B2 | 11/2016 | Toopran et al. |
| 9,679,561 B2 | 6/2017 | Bangalore et al. |
| 9,715,879 B2 | 7/2017 | Hu et al. |
| 10,079,012 B2 | 9/2018 | Klimanis et al. |
| 2014/0136210 A1 | 5/2014 | Johnston |
| 2015/0010024 A1 | 1/2015 | Dai et al. |
| 2015/0081294 A1 | 3/2015 | Hsu et al. |
| 2017/0024375 A1 | 1/2017 | Hakkani-Tur et al. |
| 2019/0005128 A1 | 1/2019 | Barari et al. |
| 2019/0020638 A1 | 1/2019 | Kostiainen et al. |

FOREIGN PATENT DOCUMENTS

| | | |
|---|---|---|
| CN | 109360565 A | 2/2019 |
| IL | 146985 A | 12/2006 |
| RU | 2597498 C1 | 9/2016 |
| RU | 2646350 C2 | 3/2018 |

OTHER PUBLICATIONS

Russian Search Report dated Nov. 1, 2021 issued in respect of the counterpart Russian Patent Application No. RU 2019145083.

*Primary Examiner* — Susan I McFadden

(74) *Attorney, Agent, or Firm* — BCF LLP

(57) ABSTRACT

There is a method and system for translating speech to text, the speech having been received by a client device. A user utterance corresponding to the speech is received. A first predicted text corresponding to the user utterance and a first confidence score corresponding to the first predicted text are determined using a local graph. The user utterance is transmitted to a server. A second predicted text corresponding to the user utterance and a second confidence score corresponding to the second predicted text is received from the server. If the first confidence score is higher than the second confidence score, the first predicted text is output.

20 Claims, 8 Drawing Sheets

METHOD OF AND SYSTEM FOR TRANSLATING SPEECH TO TEXT

CROSS-REFERENCE

The present application claims priority to Russian Patent Application No. 2019145083, entitled "Method of and System for Translating Speech to Text", filed Dec. 30, 2019, the entirety of which is incorporated herein by reference.

FIELD

The present technology relates to speech recognition in general and, more specifically, to a method of and a system for translating speech to text.

BACKGROUND

Speech recognition may be performed by a device to allow a user to more easily and naturally interact with the device. Rather than typing in text or inputting commands via a touchscreen, the user may operate the device with their speech. Various techniques have been developed in order to translate a user's speech to text. A model including a dictionary may be used for identifying the text that the user has spoken.

The model may be developed using a corpus of text, such as text gathered from dictionaries and other books, newspapers and magazines, etc. The model may indicate the likelihood that a specific word occurs in speech. The model may be considered a "universal" model and used for numerous devices. For example a single model may be developed for all English speakers from the U.S. Although these universal models can be used for a large population, they are not personalized for each user.

U.S. Pat. No. 9,147,395 assigned to LG Electronics Inc., and issued on Sep. 29, 2015, describes a mobile terminal and a voice recognition method thereof. The voice recognition method may include receiving a user's voice; providing the received voice to a first voice recognition engine provided in the server and a second voice recognition engine provided in the mobile terminal; acquiring first voice recognition data as a result of recognizing the received voice by the first voice recognition engine; acquiring second voice recognition data as a result of recognizing the received voice by the second voice recognition engine; estimating a function corresponding to the user's intention based on at least one of the first and the second voice recognition data; calculating a similarity between the first and the second voice recognition data when personal information is required for the estimated function; and selecting either one of the first and the second voice recognition data based on the calculated similarity.

US 2014/0136210 A1 assigned to Nuance Communications Inc., and filed on Nov. 14, 2012, describes personalization of speech recognition while maintaining privacy of user data is achieved by transmitting data associated with received speech to a speech recognition service and receiving a result from the speech recognition service. The speech recognition service result is generated from a general purpose speech language model. The system generates an input finite state machine from the speech recognition result and composes the input finite state machine with a phone edit finite state machine, to yield a resulting finite state machine. The system composes the resulting finite state machine with a user data finite state machine to yield a second resulting finite state machine, and uses a best path through the second resulting finite state machine to yield a user specific speech recognition result.

US 2015/0081294 A1 filed on Sep. 18, 2014, by Maluuba Inc. describes a system, method and computer program provided for generating customized text representations of audio commands A first speech recognition module may be used for generating a first text representation of an audio command based on a general language grammar A second speech recognition module may be used for generating a second text representation of the audio command, the second module including a custom language grammar that may include contacts for a particular user. Entity extraction is applied to the second text representation and the entities are checked against a file containing personal language. If the entities are found in the user-specific language, the two text representations may be fused into a combined text representation and named entity recognition may be performed again to extract further entities.

SUMMARY

Developers of the present technology have appreciated at least one technical problem associated with the prior art approaches.

The present technology relates to speech recognition, and more specifically to methods and systems for translating speech to text. Users of client devices are likely to include personal data in their speech. Some of this personal data may be stored on their client device. For example the user may request to call a contact stored on their client device or play a song stored on their client device. A universal model might not perform well at interpreting these requests. The universal model might not reflect that the user is more likely than the general population to speak words in their personal data. The user experience may be improved if a system for translating speech to text were tailored to the user's personal data.

As has been alluded to above, speech recognition models are typically based on a universal corpus of text and are applied to a large set of users. A model tailored to an individual might provide more accurate results.

A system for translating speech to text that uses a universal model may be augmented be including a second model, which is referred to herein as a local graph. The local graph may be specific to a single user and may be generated using text stored on the user's client device. The local graph may be stored on the client device.

After receiving a user utterance, such as by a microphone in the client device, the user utterance may be input to the local graph and the universal graph. Both the local graph and the universal graph may output a predicted text for the user utterance and/or a confidence score corresponding to the prediction. The confidence scores may be compared, and either the predicted text from the local graph or the predicted text from the universal graph may be selected.

According to a first broad aspect of the present technology, there is provided a method for translating speech to text, the speech having been received by a client device. The method is executable on the client device and comprises: receiving a user utterance corresponding to the speech; determining, based on a local graph stored by the client device, a first predicted text corresponding to the user utterance and a first confidence score corresponding to the first predicted text, wherein the local graph comprises a tree, wherein each leaf of the tree corresponds to a word, and wherein the local graph is generated based on text stored by the client device; transmitting, to a server, the user utterance;

receiving, from the server, a second predicted text corresponding to the user utterance and a second confidence score corresponding to the second predicted text; comparing the first confidence score to the second confidence score; and after determining that the first confidence score is greater than the second confidence score, outputting the first predicted text.

In some implementations of the method, a first node on each branch of the tree comprises a first letter of a word.

In some implementations of the method, each subsequent node after the first node comprises a subsequent letter of the word.

In some implementations of the method, a first leaf in the tree comprises a first conjugation of a word, and wherein a second leaf in the tree comprises a second conjugation of the word, the first leaf and the second leaf having a common parent node in the tree.

In some implementations of the method, each leaf of the tree is associated with a confidence score, and wherein the confidence score indicates a frequency that a word corresponding to the respective leaf occurs in the text stored by the client device.

In some implementations of the method, determining the first predicted text comprises determining a leaf, of the tree, corresponding to the user utterance, and wherein the first confidence score comprises the confidence score corresponding to the leaf.

In some implementations of the method, the local graph is generated by: applying the text stored by the client device to a normalizer, thereby generating normalized text; applying the text stored by the client device and the normalized text to an inflector, thereby generating inflected text; and generating the local graph based on the text stored by the client device, the normalized text, and the inflected text.

In some implementations of the method, the normalizer converts numerals in the text stored by the client device to text.

In some implementations of the method, the inflector receives a word and generates a plurality of forms of the word.

In some implementations of the method, the text stored by the client device comprises a contact list.

In some implementations of the method, the text stored by the client device corresponds to music stored by the client device.

In some implementations of the method, the local graph is personalized for a user of the client device.

In some implementations of the method, the local graph is an n-gram tree, and each node in the local graph corresponds to an individual n-gram.

In accordance with yet another broad aspect of the present technology, there is provided a method for translating speech to text, the speech having been received by a client device. The method is executable on a server and comprises: receiving, from the client device, a user utterance corresponding to the speech; determining, based on a graph, a first predicted text corresponding to the user utterance and a first confidence score corresponding to the first predicted text, wherein the graph comprises a tree, and wherein each leaf of the tree corresponds to a word; receiving, from the client device, a second predicted text corresponding to the user utterance and a second confidence score corresponding to the second predicted text, wherein the second predicted text was determined by the client device, wherein the second predicted text was determined based on a local graph stored by the client device, and wherein the local graph was generated based on text stored by the client device; comparing the first confidence score to the second confidence score; and after determining that the first confidence score is greater than the second confidence score, transmitting, to the client device, the first predicted text.

In some implementations of the method, a first leaf in the tree comprises a first conjugation of a word, and a second leaf in the tree comprises a second conjugation of the word, the first leaf and the second leaf having a common parent node in the tree.

In some implementations of the method, each leaf of the tree is associated with a confidence score, and wherein the confidence score indicates a frequency of a word corresponding to the respective leaf occurring in the text stored by the client device.

In accordance with yet another broad aspect of the present technology, there is provided a method for translating speech to text, the speech having been received by a client device. The method is executable on a server and comprises: receiving, from the client device, a user utterance corresponding to the speech; determining, based on a graph, a first predicted text corresponding to the user utterance and a first confidence score corresponding to the first predicted text, wherein the graph comprises a tree, and wherein each leaf of the tree corresponds to a word; and transmitting, to the client device, the first predicted text and the first confidence score for comparing the first predicted text and the first confidence score to a second predicted text and a second confidence score, wherein the second predicted text and the second confidence score was determined by the client device based on a local graph stored by the client device, and wherein the local graph was generated based on text stored by the client device.

In some implementations of the method, each leaf of the tree is associated with a confidence score.

In some implementations of the method, the graph corresponds to a graph used to translate speech to text for a plurality of client devices, and the local graph is unique to the client device.

In some implementations of the method, the local graph was generated based on the text stored by the client device, normalized text, and inflected text, the normalized text was generated by applying the text stored by the client device to a normalizer, and the inflected text was generated by applying the text stored by the client device and the normalized text to an inflector.

In accordance with yet another broad aspect of the present technology, there is provided a method for translating speech to text, the speech having been received by a client device. The method is executable on the client device and comprises: receiving a user utterance corresponding to the speech; determining, based on a local graph stored by the client device, a predicted text corresponding to the user utterance and a confidence score corresponding to the predicted text, wherein the local graph comprises a tree, wherein each leaf of the tree corresponds to a word, and wherein the local graph is generated based on text stored by the client device; comparing the confidence score to a threshold confidence score; determining, based on a threshold confidence score, whether to transmit the user utterance to a server; after determining that the confidence score satisfies the threshold confidence score, determining not to transmit the user utterance to the server; and outputting the predicted text.

In the context of the present specification, a "server" is a system and/or computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drives, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first," "second," "third," etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the servers, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware and/or share software and/or hardware. In other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
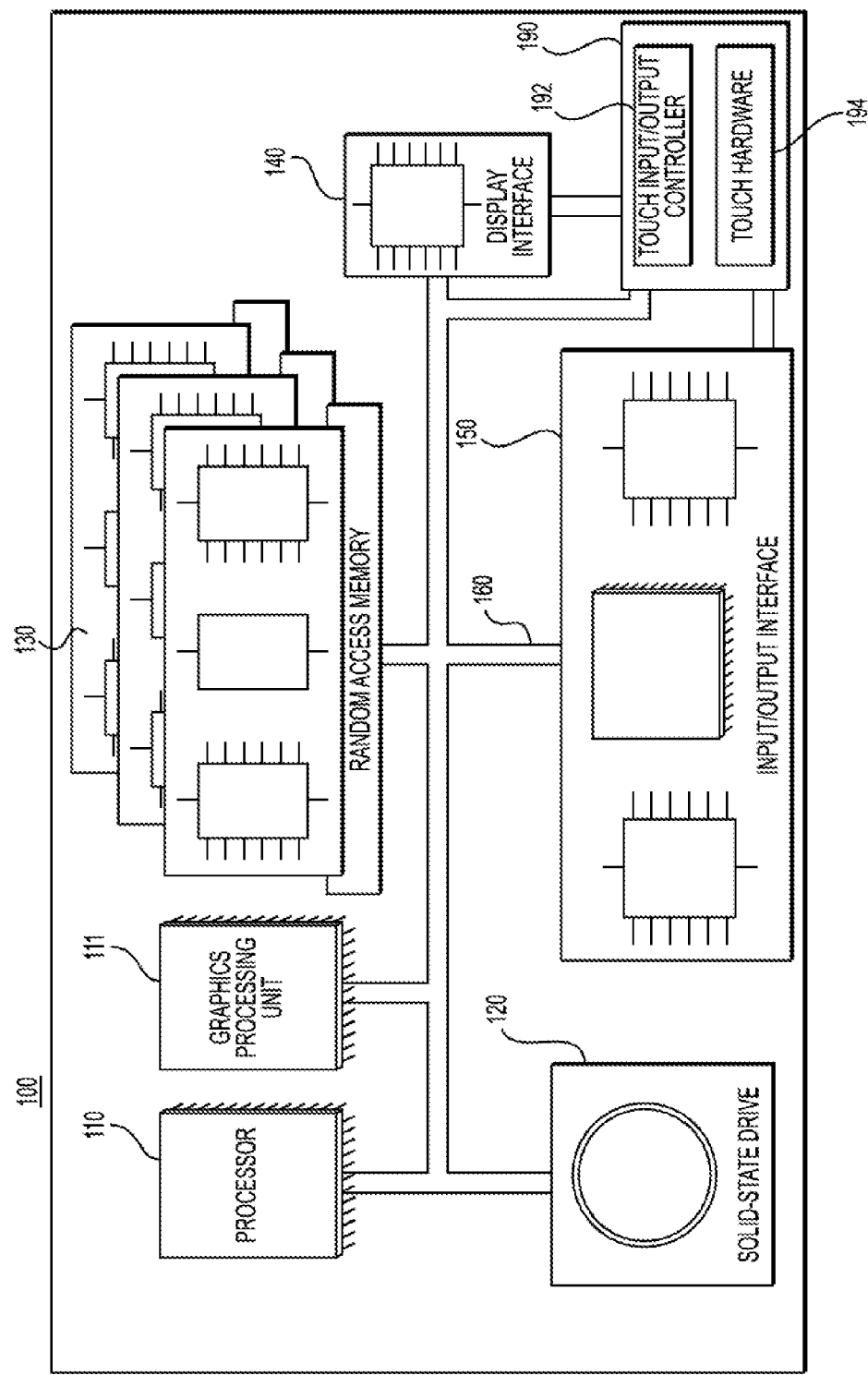
FIG. 1 is an illustration of components and features of a computing device in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computing device 100 suitable for use with some implementations of the present technology. The computing device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computing device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing device 100 in addition to or instead of the touchscreen 190. In some embodiments, the computing device 100 may comprise one or more microphones (not shown). The microphones may record audio, such as user utterances. The user utterances may be translated to commands for controlling the computing device 100.

It is noted some components of the computing device 100 can be omitted in some non-limiting embodiments of the present technology. For example, the touchscreen 190 can be omitted, especially (but not limited to) where the computing device is implemented as a smart speaker device.

According to implementations of the present technology, the solid-state drive 120 stores program instructions suitable for being loaded into the random access memory 130 and executed by the processor 110 and/or the GPU 111. For example, the program instructions may be part of a library or an application.

The computing device 100 may be a server, a desktop computer, a laptop computer, a tablet, a smartphone, a personal digital assistant or any device that may be configured to implement the present technology, as should be understood by a person skilled in the art.

Figure 2:
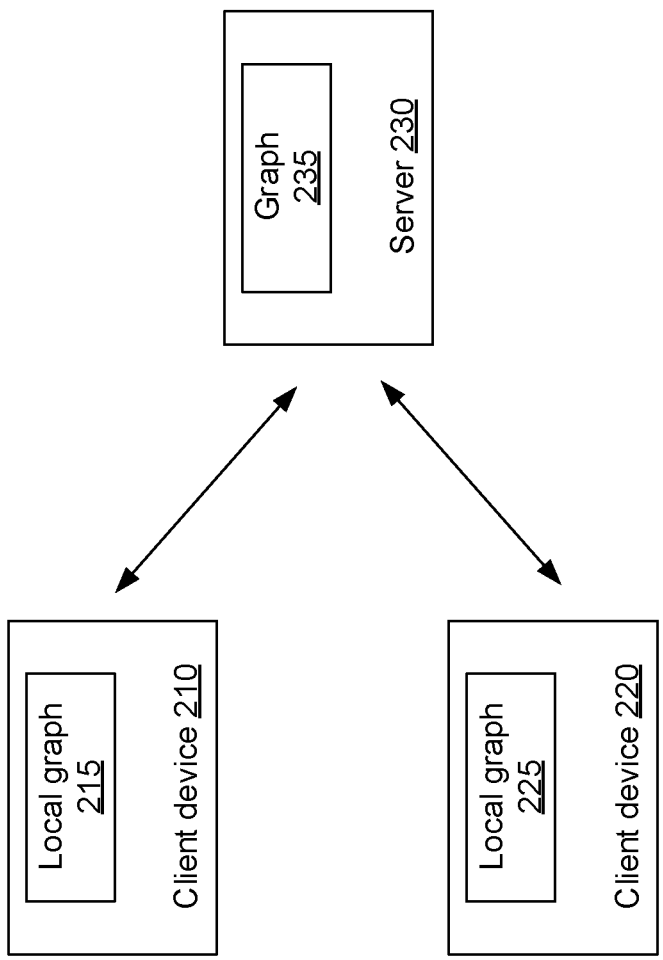
FIG. 2 depicts a diagram of a system for translating speech to text implemented in accordance with non-limiting embodiments of the present technology.

With reference to FIG. 2, there is depicted a diagram of a system for translating speech to text implemented according to non-limiting embodiments of the present technology. Two client devices 210 and 220 are illustrated. The client devices 210 and 220 may be computing devices 100, such as smartphones, tablets or smart speaker devices. Each of the client devices 210 and 220 may be operated by different users.

The client devices 210 and 220 may store various data corresponding to the user of each device. For example the client devices 210 and 220 may store contacts, emails, text messages, music, web browsing history, calendar data, applications, etc. Although described as being stored on the client devices 210 and 220, some or all of this data may be stored remotely from the client devices 210 and 220. For example a contact list used by the client device 210 may be stored in a cloud storage environment or a remote server.

The data stored on the client device 210 may be used to generate a local graph 215. The local graph 215 may be generated by the client device 210. The local graph 215 may be stored on the client device 210. The local graph 215 may include a dictionary of words present in the data stored on the client device 210. The local graph 215 may include a predicted likelihood of each word in the graph being included in text. The predicted likelihood may be determined based on the frequency of the word in the data stored on the client device 210. Similarly, a local graph 225 may be generated for the client device 220 based on data stored on the client device 220.

The local graphs 215 and 225 may be used to predict words occurring in a user utterance. In addition to the prediction, the local graphs 215 and 225 may be used to determine a confidence score corresponding to the prediction. Because the local graphs 215 and 225 are generated using data stored on the client devices 210 and 220, each of these local graphs 215 and 225 is personalized for the associated client device 210 or 220. If both local graphs 215 and 225 received identical input, the local graphs 215 and 225 might output different predictions.

The client devices 210 and 220 may be in communication with a server 230, such as via a network connection. The server 230 may provide an interface for translating speech to text. The server 230 may store a graph 235. The graph 235 may have a same or similar format to the local graphs 215 and 225. But unlike the local graphs 215 and 225, the graph 235 may be used for processing requests received from multiple client devices, such as hundreds of thousands of client devices. The client devices 210 and 220 may transmit user utterances to the server 230. The server 230 may then use the graph 235 to predict text corresponding to the user utterances. The graph 235 may output a confidence score for each prediction.

The confidence scores output by the local graphs 215 and 225 may be compared to the graph 235. If the local graph 215 or 225 has a higher confidence score, the prediction made by the local graph 215 or 225 may be used. If, on the other hand, the graph 235 has the higher confidence score for a prediction, the prediction output by the graph 235 may be used.

Predictions generated using both a local graph 215 or 225 and the graph 235 may be more accurate than predictions generated using a local graph 215 or 225 alone, and more accurate than predictions generated using only the graph 235. By using both a local graph 215 or 225 and the graph 235, the predictions have the benefit of being tailored for an individual user because of the local graph 215 or 225, and also gaining the benefit of a larger universal dataset with the graph 235.

Figure 3:
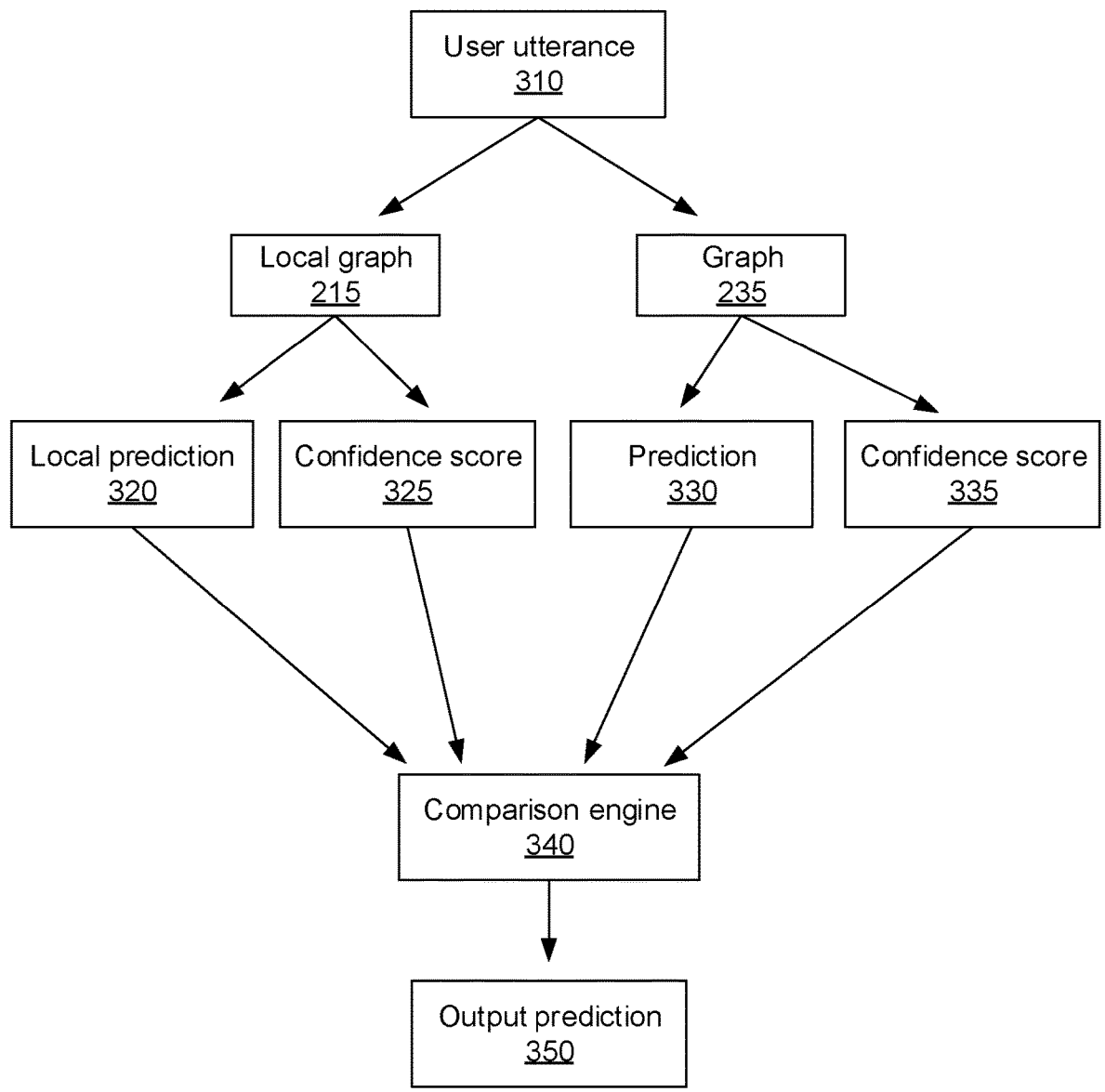
FIG. 3 depicts a diagram of a system for processing a user utterance in accordance with non-limiting embodiments of the present technology.

With reference to FIG. 3, there is depicted a diagram of a system for processing a user utterance according to non-limiting embodiments of the present technology. A user utterance 310 may be recorded speech, such as a spoken command from a user of the client device 210. The user utterance 310 may be recorded after a trigger word to begin recording is detected. For example if the trigger word is "Alice," a user utterance spoken after the word "Alice" may be recorded.

The user utterance may be recorded by one or more microphones, such as one or more microphones in the client device 210. The user utterance may be recorded by a microphone external to the client device 210, such as the microphone of a headset communicating wirelessly with the client device 210.

After receiving the user utterance 310, the client device 210 uses the local graph 215 to determine a local prediction 320 for the user utterance 310. A confidence score 325 may be determined for the local prediction 320. The local prediction 320 may be a predicted text corresponding to the user utterance 310. The confidence score 325 may indicate a confidence associated with the local prediction 320.

The client device 210 may transmit the user utterance 310 to the server 230. It is noted that the client device 210 may transmit the user utterance to the server 230 as soon as the client device 210 receives the user utterance 310, such as the local processing described above and the server processing about to be described are executed substantially in parallel. Other implementations are also possible, as will be described in greater detail herein below. The server 230 may use the graph 235 to determine a prediction 330 for the user utterance 310. The server 230 may use the graph 235 to determine confidence score 335 for the prediction 330. Like the local prediction 320, the prediction 330 may include a predicted text corresponding to the user utterance 310. The confidence score 335 may indicate a level of confidence in the prediction 330.

A comparison engine 340 may receive and compare the confidence score 325 and the confidence score 335. The comparison engine 340 may receive the predictions 320 and 330 and/or the confidence scores 325 and 335. The comparison engine 340 may then determine an output prediction 350. The comparison engine 340 may be located on the client device 210, the server 230, and/or on another device. The comparison engine 340 may select whichever prediction 320 or 330 has the highest confidence score 325 or 335. The selected prediction 320 or 330 may be output as the output prediction 350.

In some instances a threshold may be used, where the local prediction 320 may be selected even if the confidence score 325 is lower than the confidence score 335. In this instance, if the confidence score 325 is lower than the confidence score 335 by less than the pre-determined threshold amount, then the local prediction 320 may be output as the output prediction 350 by the comparison engine 340.

The user utterance 310 might not be sent to the server 230 for a prediction using the graph 235. If the confidence score 325 satisfies a pre-determined threshold, the user utterance 310 might not be sent to the server 230. In this case, the output prediction 350 would be the local prediction 320. Because the prediction 330 would not be generated in this instance, the comparison engine 340 might not be used.

Figure 4:
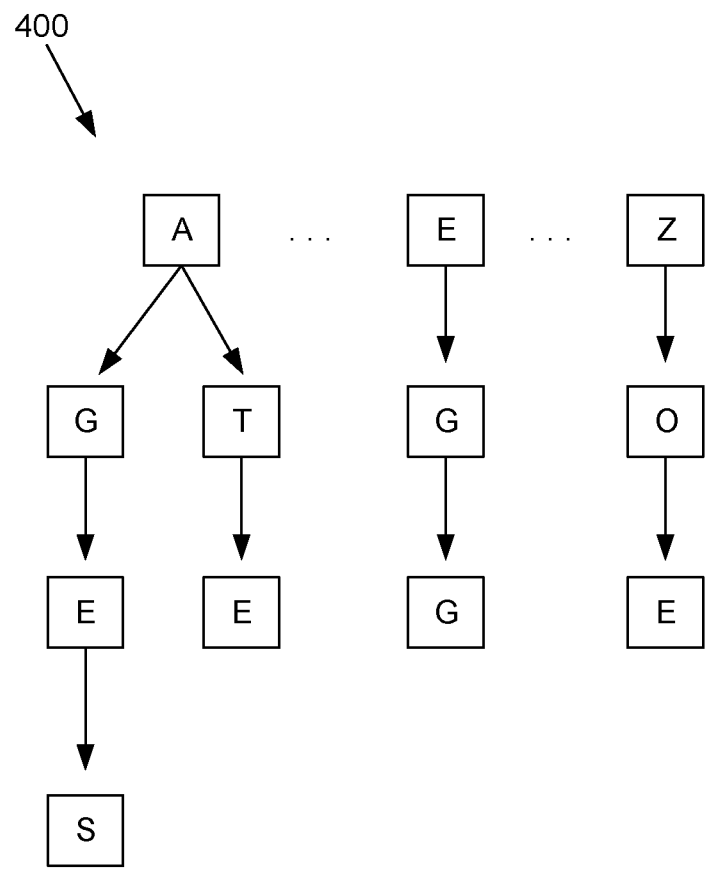
FIG. 4 depicts a graph in accordance with non-limiting embodiments of the present technology.

With reference to FIG. 4, there is depicted a graph 400 according to non-limiting embodiments of the present technology. The graph 400 includes nodes and edges connecting the nodes. The nodes are illustrated as containing individual letters. Although illustrated as including letters, in some instances each node may contain multiple letters such as n-grams (such as bi-grams, tri-grams, or the like). The graphs 215, 225, and 235 may be in a same or similar format to the illustrated graph 400.

The graph 400 is in the format of a prefix-based tree. In the tree, each node is connected by exactly one edge. At the first level of the tree are 26 roots, corresponding to the letters 'A' through 'Z', as an example, if the English alphabet was used. Each is noted that the tree can have more roots, for example 33 roots, if the Russian alphabet was to be used instead.

Each root is then connected to various other nodes, which may be referred to as children nodes, terminating in the final node which is referred to as a leaf. The set of nodes between the root and a leaf is referred to as a branch. Each branch forms at least one word, with the leaf being the final letter of a word. For example the leftmost branch in the graph 400 contains the words 'age' and 'ages.' The branches may form proper nouns, such as the rightmost branch in the graph 400 which forms the name 'Zoe.'

Multiple conjugations of a word may be stored in the graph 400, such as multiple conjugations generated by an inflector (described in further detail below). The multiple conjugations may share one or more common nodes, such as a common root. Each word and/or leaf stored in the graph 400 may be associated with a score. The score may indicate a frequency at which the word occurs in the text used to generate the graph 400. The score for each word may be stored in the graph 400. The score may be a confidence score for a prediction, such as the confidence scores 325 and 335. In some non-limiting embodiments of the present technology, the different conjugations of the same word may share the same confidence score.

Rather than looking at each word individually, it may be beneficial to examine the relationship between words to improve prediction accuracy. Boost scores may be determined for words that frequently occur together in the text used to generate the graph 400. The boost scores may be stored separately from the graph 400. If a first word is recognized in the user utterance using the graph 400, the boost scores corresponding to that first word may be used to predict a next word in the user utterance. For example, some boost scores can boost a given conjugation of a second word, which follows a first word, if the conjugation of the second word depends on the form of the first word.

Figure 5:
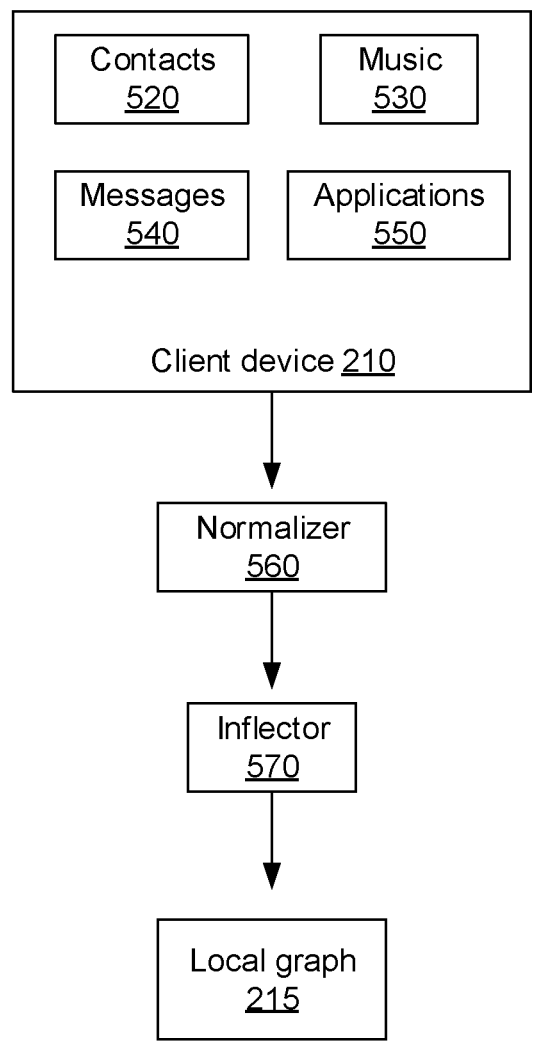
FIG. 5 depicts a diagram of a system for generating a local graph in accordance with non-limiting embodiments of the present technology.

With reference to FIG. 5, there is depicted a diagram of a system for generating a local graph according to non-limiting embodiments of the present technology. The client device 210 may store various data for the user of the client device 210. For example the client device 210 may store contacts 520, music 530, messages 540 (text, emails, etc.), applications 550, and/or other data. Although illustrated as being stored in the client device 210, it should be understood that all or portions of the contacts 520, music 530, messages 540, and/or applications 550 may be stored outside of the client device 210, such as in a cloud environment.

Text may be generated corresponding to the contacts 520, music 530, messages 540, applications 550, and/or other data stored by the client device 210. For example, the names of all of the contacts 520 may be extracted, the titles and artists of all music 530 may be extracted, the names of applications 550 may be extracted, etc. This text may form a corpus of text used to generate a local graph 215.

After generating the corpus of text using the data stored on the client device 210, the corpus may be input to a normalizer 560. The normalizer 560 may be stored and/or executed on the client device 210 and/or on a server. If the normalizer 560 is executed on the server, the corpus of text may be transmitted by the client device 210 to the server. The normalizer 560 may translate any non-text portions of the corpus of text into text. The normalizer 560 may convert numerals, abbreviations, slang, and/or local expressions into text. For example if the corpus of text includes the numeral "24," the normalizer may convert this numeral into the text "twenty four." In another example, if the corpus of text includes "$4.50," the normalizer 560 may convert this into "four dollars, fifty cents." In yet another example, if the corpus of text includes "12 ft," the normalizer 560 may convert this into "twelve feet." Although English examples are provided here, the normalizer 560 may function for other languages, such as Russian. The normalizer 560 may replace the original text in the corpus of text with the translated text and/or retain the original text in the corpus of text and add the translated text to the corpus of text.

After the corpus of text has been processed by the normalizer 560, the corpus of text may be input to an inflector 570. Like the normalizer 560, the inflector 570 may be stored and/or executed on the client device 210 and/or a separate device such as a server. The inflector 570 may generate alternate forms of text in the corpus. The inflector 570 may generate alternate conjugations of words, alternate spellings of words, etc. For example if the text "twenty-four" were received by the inflector 570, the inflector may output "twenty four" and "two four." The output of the inflector 570 may be added to the corpus of text.

After the corpus of text has been processed by the normalizer 560 and inflector 570, the local graph 215 may be generated using the corpus of text. The local graph 215 may include each word in the corpus of text. The local graph 215 may indicate a frequency of occurrence for each word in the corpus of text. The local graph 215 may then be used for predicting text corresponding to a user utterance.

It should be noted that even though the above examples have been provided with the local graph 215 being stored by the client device 210 and the graph 235 being stored on the server 230, the two graphs (the local graph 215 and the graph 235) can be stored at a single physical storage medium, be it the server 230 or the client device 210.

Method (Non-Limiting Embodiment)

Figure 6:
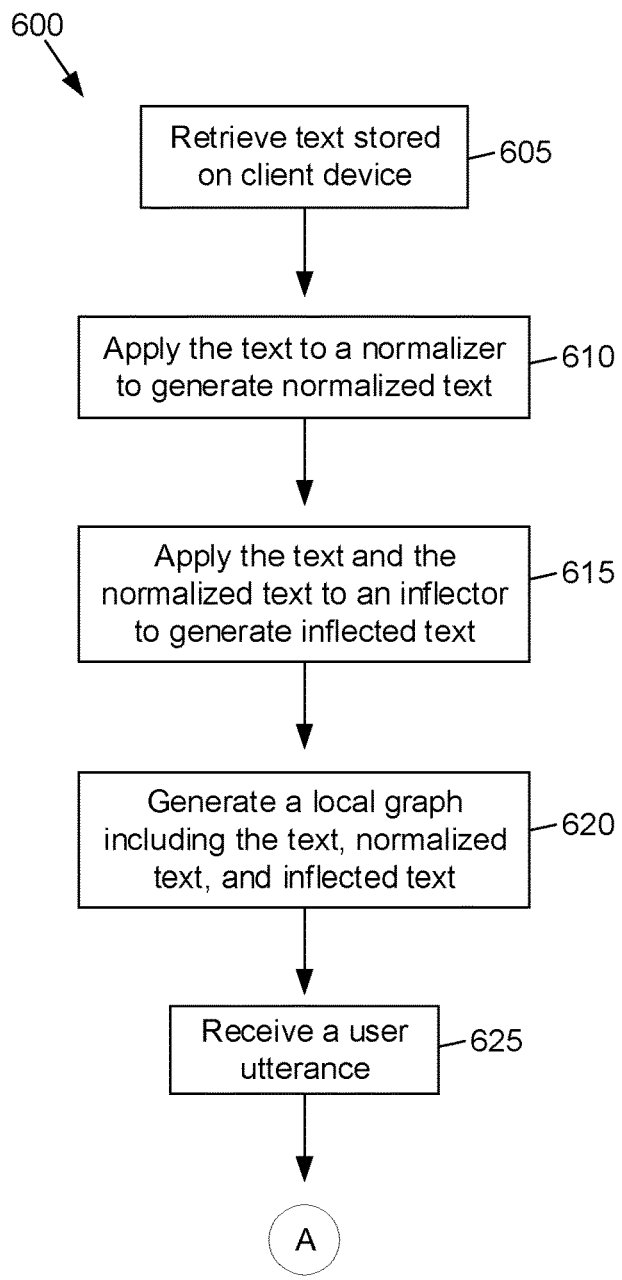
FIGS. 6, 7, and 8 depict a flow diagram of a method for translating speech to text in accordance with some non-limiting embodiments of the present technology.
Figure 7:
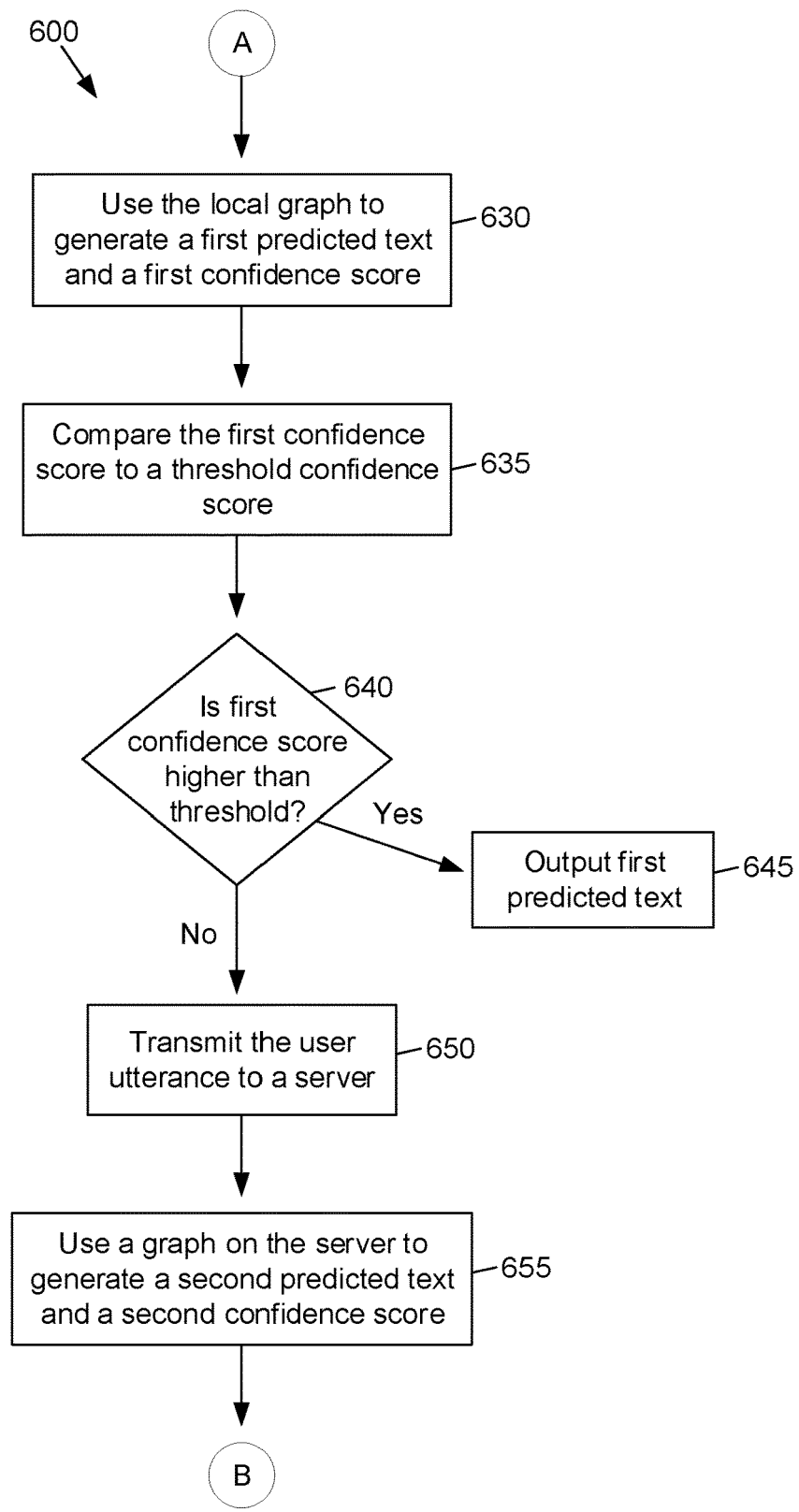
Figure 8:
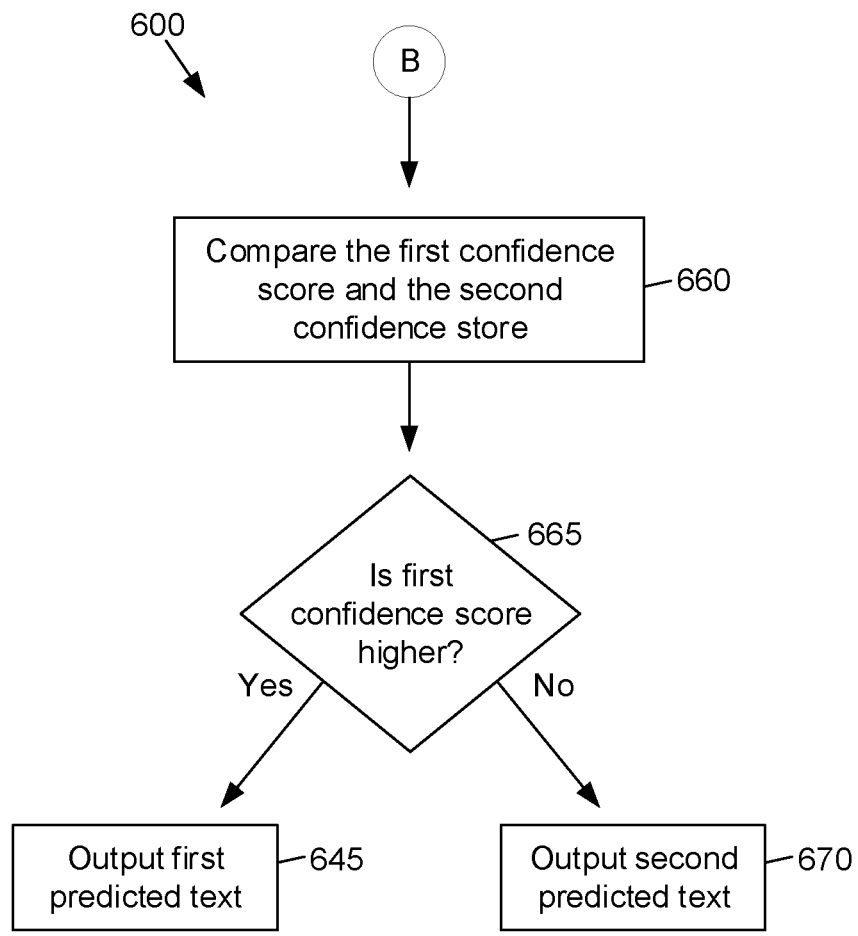

With reference to FIGS. 6, 7, and 8, there is depicted a flow diagram of a method 600, the method 600 being implementable in accordance with non-limiting embodiments of the present technology.

Step 605—Retrieve Text Stored on Client Device

The method 600 begins at step 605. At step 605 text and/or other data stored on a client device may be retrieved. The text may include contacts 520, music 530, messages 540, applications 550, playlists, books, calendar data, and/or any other data stored on the client device. Although described as text stored on a client device, other data may be retrieved that is associated with a user of the client device regardless of whether the data is stored on the client device, such as user data stored in a cloud environment.

The retrieved data may originate from multiple devices, such as multiple devices associated with a same user. For example if a user has both a smartphone and a tablet device, the data may be retrieved from both the smartphone and the tablet device.

Step 610—Apply the Text to a Normalizer

At step 610 the text retrieved at step 605 may be applied to a normalizer, such as the normalizer 560. The normalizer may output normalized text corresponding to the text retrieved at step 605. As described above, the normalizer may convert numerals, abbreviations, slang, and/or local expressions into text. The normalizer may apply a set of rules and/or set of functions to the text. The normalizer may traverse the entirety of the text retrieved at step 605.

Step 615—Apply the Text to an Inflector

At step 615 the text retrieved at step 605 and/or the normalized text generated at step 610 may be input to an inflector, such as the inflector 570. The inflector may output inflected text. As described above, the inflector may generate alternate forms of text, such as alternate conjugations, alternate spellings, etc. The inflector may generate alternate forms of words in the text received at step 605 and/or the normalized text generated at step 610.

Depending on the language of the text, steps 610 and/or 615 may be skipped. For example the normalizer might not be applied to text stored in English. If data in multiple languages are stored on the client device, the text retrieved at step 605 may be clustered by language. The normalizer and/or inflector may be applied to a subset of the clusters, based on the language of each cluster.

Step 620—Generate a Local Graph

At step 620 a local graph may be generated using the text retrieved at step 605, the normalized text generated at step 610, and/or the inflected text generated at step 615. The local graph may be generated by a client device and/or a server. After the local graph is generated, the local graph may be stored on the client device.

The local graph may include a tree having nodes and edges connecting the nodes. Each node may correspond to a single letter. The first node on each branch of the tree may correspond to a first letter of a word. Subsequent nodes on the branch may correspond to subsequent letters of the word. Each branch terminates in a node referred to as a leaf. The leaf may contain the final letter of a word formed by the branch. Each leaf may correspond to a word, where the word is formed with each letter from the root node to the leaf.

The graph may indicate the frequency at which each word represented in the graph occurs in the text retrieved at step 605, the normalized text generated at step 610, and/or the inflected text generated at step 615. The frequency may be in the form of a percentage. The frequency may be stored as edge weights in the graph.

Step 625—Receive a User Utterance

At step 625 a user utterance may be received. The user utterance may be received by a client device, such as by a microphone of the client device. The user utterance may be a word or multiple words. The user utterance may be a command, request, or any other spoken utterance. As described above, a trigger word may be spoken to indicate that the user utterance following the trigger word should be captured.

After receiving the user utterance, the user utterance may be modified for speech to text processing. Filters may be applied to the user utterance, such as to reduce background noise. The user utterance may be split into multiple segments, such as to separate the user utterance into individual words and/or sentences. If multiple speakers are detected in the recorded audio, the user utterance from an individual speaker may be isolated in the audio.

Step 630—Use the Local Graph to Generate a Predicted Text

At step 630 the local graph generated at step 620 may be used to determine a predicted text corresponding to the user utterance received at step 625. The predicted text may be one word or multiple words. The local graph may be used to determine a first confidence score corresponding to the predicted text. A beam search may be performed using the local graph to determine the predicted text.

As described above, the local graph may indicate a frequency of the predicted word. The first confidence score may be determined based on the frequency of the predicted word. For example if the predicted word has a relatively high indicated frequency, the first confidence score may be relatively high. Conversely, if the predicted word has a relatively low indicated frequency, the first confidence score may be relatively low.

Steps 635 and 640—Compare the First Confidence Score to a Threshold Score At steps 635 and 640 the first confidence score may be compared to a pre-determined threshold confidence score. The pre-determined threshold confidence score may have been set by an operator of the speech to text system. The pre-determined threshold confidence score may be a relatively high score. It may be more efficient to rely solely on the predicted text made by a local graph, such as the local graph 215, rather than having both the local graph and another graph, such as the graph 235, render a prediction. If the confidence score for the prediction by the local graph is sufficiently high, it might be assumed that the prediction from the other graph will not have a high enough confidence score to be selected as the predicted text to output. It may also be assumed that if the prediction by the local graph has a sufficiently high confidence score then the prediction by the local graph is likely correct. In that case, generating another prediction by another graph may be unnecessary, time consuming, and/or may reduce the accuracy of the speech to text system.

If, at step 640, a determination is made that the first confidence score is higher than the threshold confidence score, the method 600 may finish at step 645. Otherwise, if the first confidence score is lower than the threshold score, the method 600 may continue to step 650 where a predicted text corresponding to the user utterance will be determined using another graph. In some instances the speech to text system may be configured to always determine a second predicted text, in which case steps 635 and 640 may be skipped and the method 600 may proceed directly from step 630 to 650.

Step 645—Output the First Predicted Text

At steps 645 the first predicted text may be output. The first predicted text may be displayed. The first predicted text may be used as an input to an application. For example the first predicted text may be output using an application programming interface (API). If the first predicted text corresponds to a command, the command may be performed by the client device.

Step 650—Transmit the User Utterance to a Server

At step 650 the user utterance may be transmitted to a server, such as the server 230. The server may be a server communicating with many other client devices. The server may be a group of servers, such as a cloud-based application. The server may implement a speech to text system.

Step 655—Generate Second Predicted Text

At step 655 a second predicted text may be determined by the server using a graph, such as the graph 235. A second confidence score may be determined corresponding to the second prediction. The graph may be a graph used to generate predictions for multiple client devices. The graph may be generated using a general corpus of text, rather than text specific to a client device like the local graph. The graph may be similar in form to the local graph. Like the local graph, the graph may include a tree where each node in the tree corresponds to a letter. The tree may indicate a frequency at which each word in the tree occurs. A beam search may be performed using the graph to determine the second text. The second confidence score may be determined based on the frequency at which the predicted word occurs in the text used to generate the graph.

Steps 660 and 665—Compare the First Confidence Score to a Threshold Score At steps 660 and 665 the first confidence score may be compared to the second confidence score. If the first confidence score is determined to be higher at step 665, the first predicted text may then be output at step 645. If the second confidence score is higher, the second predicted text may be output at step 670.

In some instances the first predicted text may still be output even though the second confidence score is higher. The second confidence score may be lowered, such as by subtracting a pre-determined amount or applying a formula to the second confidence score. Alternatively, a pre-determined threshold may be used, where the first predicted text may be output if the first confidence score is within the threshold difference from the second confidence score. For example if the threshold is five percent, the first confidence score is 87 percent, and the second confidence score is 89 percent, the first predicted text would be output even though the second confidence score is higher.

Step 670—Output the Second Predicted Text

At step 670 the second predicted text may be output. The method 600 may then terminate. Actions performed at step 670 may be similar to those described above with regard to step 645.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be used as examples rather than limiting. The scope of the present technology is therefore intended to be limited solely by the scope of the appended claims.

The invention claimed is:

1. A method for translating speech to text, the speech having been received by a client device, the method executable on the client device, the method comprising:
    receiving a user utterance corresponding to the speech;
    determining, based on a local graph stored by the client device, a first predicted text corresponding to the user utterance and a first confidence score corresponding to the first predicted text, wherein the local graph comprises a tree, wherein each leaf of the tree corresponds to a word, and wherein the local graph is generated based on text stored by the client device;
    transmitting, to a server, the user utterance;
    receiving, from the server, a second predicted text corresponding to the user utterance and a second confidence score corresponding to the second predicted text;
    comparing the first confidence score to the second confidence score; and
    after determining that the first confidence score is greater than the second confidence score, outputting the first predicted text.

2. The method of claim 1, wherein a first node on each branch of the tree comprises a first letter of a word.

3. The method of claim 2, wherein each subsequent node after the first node comprises a subsequent letter of the word.

4. The method of claim 1, wherein a first leaf in the tree comprises a first conjugation of a word, and wherein a second leaf in the tree comprises a second conjugation of the word, the first leaf and the second leaf having a common parent node in the tree.

5. The method of claim 1, wherein each leaf of the tree is associated with a confidence score, and wherein the confidence score indicates a frequency that a word corresponding to the respective leaf occurs in the text stored by the client device.

6. The method of claim 5, wherein determining the first predicted text comprises determining a leaf, of the tree, corresponding to the user utterance, and wherein the first confidence score comprises the confidence score corresponding to the leaf.

7. The method of claim 1, wherein the local graph is generated by:
    applying the text stored by the client device to a normalizer, thereby generating normalized text;
    applying the text stored by the client device and the normalized text to an inflector, thereby generating inflected text; and
    generating the local graph based on the text stored by the client device, the normalized text, and the inflected text.

8. The method of claim 7, wherein the normalizer converts numerals in the text stored by the client device to text.

9. The method of claim 7, wherein the inflector receives a word and generates a plurality of forms of the word.

10. The method of claim 1, wherein the text stored by the client device comprises a contact list.

11. The method of claim 1, wherein the text stored by the client device corresponds to music stored by the client device.

12. The method of claim 1, wherein the local graph is personalized for a user of the client device.

13. The method of claim 1, wherein the local graph is an n-gram tree, and wherein each node in the local graph corresponds to an individual n-gram.

14. A method for translating speech to text, the speech having been received by a client device, the method executable on a server, the method comprising:
    receiving, from the client device, a user utterance corresponding to the speech;
    determining, based on a graph, a first predicted text corresponding to the user utterance and a first confidence score corresponding to the first predicted text, wherein the graph comprises a tree, and wherein each leaf of the tree corresponds to a word;
    receiving, from the client device, a second predicted text corresponding to the user utterance and a second confidence score corresponding to the second predicted text, wherein the second predicted text was determined by the client device, wherein the second predicted text was determined based on a local graph stored by the client device, and wherein the local graph was generated based on text stored by the client device;
    comparing the first confidence score to the second confidence score; and after determining that the first confidence score is greater than the second confidence score, transmitting, to the client device, the first predicted text.

15. The method of claim 14, wherein a first leaf in the tree comprises a first conjugation of a word, and wherein a second leaf in the tree comprises a second conjugation of the word, the first leaf and the second leaf having a common parent node in the tree.

16. The method of claim 14, wherein each leaf of the tree is associated with a confidence score, and wherein the confidence score indicates a frequency of a word corresponding to the respective leaf occurring in the text stored by the client device.

17. A method for translating speech to text, the speech having been received by a client device, the method executable on a server, the method comprising:

receiving, from the client device, a user utterance corresponding to the speech;

determining, based on a graph, a first predicted text corresponding to the user utterance and a first confidence score corresponding to the first predicted text, wherein the graph comprises a tree, and wherein each leaf of the tree corresponds to a word; and transmitting, to the client device, the first predicted text and the first confidence score for comparing the first predicted text and the first confidence score to a second predicted text and a second confidence score, wherein the second predicted text and the second confidence score was determined by the client device based on a local graph stored by the client device, and wherein the local graph was generated based on text stored by the client device.

18. The method of claim 17, wherein each leaf of the tree is associated with a confidence score.

19. The method of claim 17, wherein the graph corresponds to a graph used to translate speech to text for a plurality of client devices, and wherein the local graph is unique to the client device.

20. A method for translating speech to text, the speech having been received by a client device, the method executable on the client device, the method comprising:

receiving a user utterance corresponding to the speech;

determining, based on a local graph stored by the client device, a predicted text corresponding to the user utterance and a confidence score corresponding to the predicted text, wherein the local graph comprises a tree, wherein each leaf of the tree corresponds to a word, and wherein the local graph is generated based on text stored by the client device;

comparing the confidence score to a threshold confidence score;

determining, based on a threshold confidence score, whether to transmit the user utterance to a server;

after determining that the confidence score satisfies the threshold confidence score, determining not to transmit the user utterance to the server; and outputting the predicted text.

* * * * *